Figure 5:
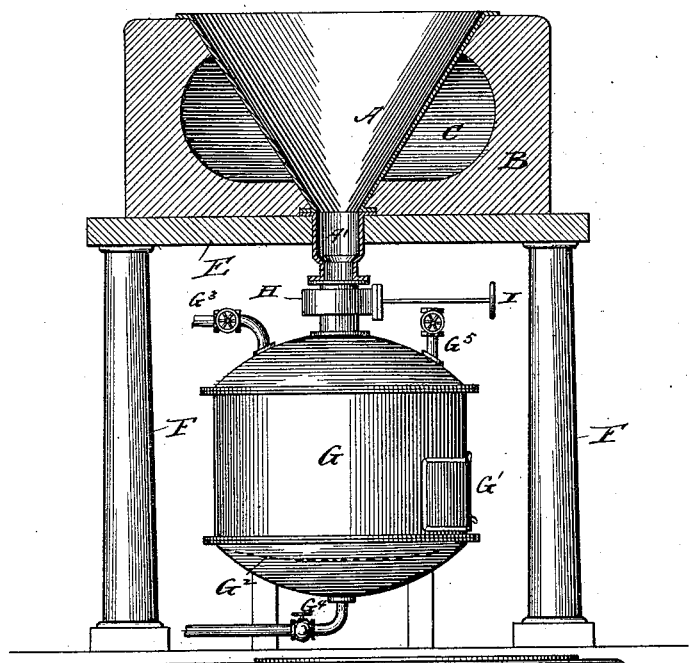

(No Model.) 4 Sheets—Sheet 1.
A. DOMEIER & O. C. HAGEMANN.
APPARATUS FOR CONCENTRATING SPENT SOAP LYE.
No. 428,469. Patented May 20, 1890.
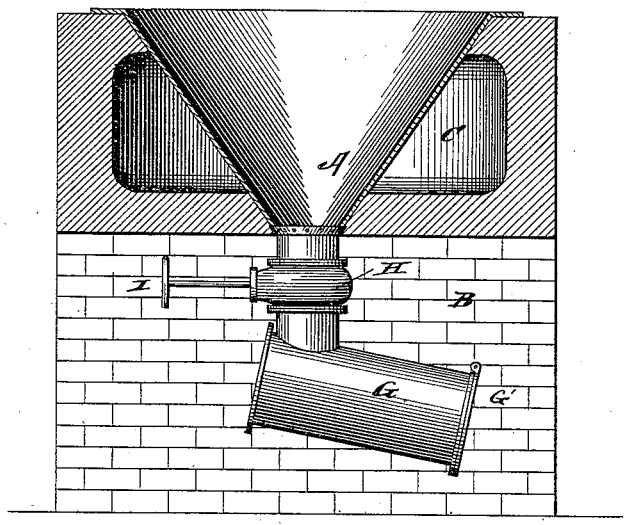
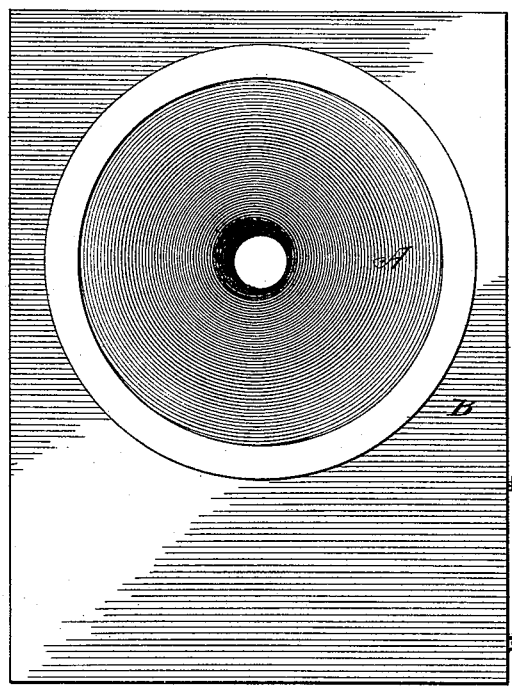

(No Model.) 4 Sheets—Sheet 2.
A. DOMEIER & O. C. HAGEMANN.
APPARATUS FOR CONCENTRATING SPENT SOAP LYE.
No. 428,469. Patented May 20, 1890.
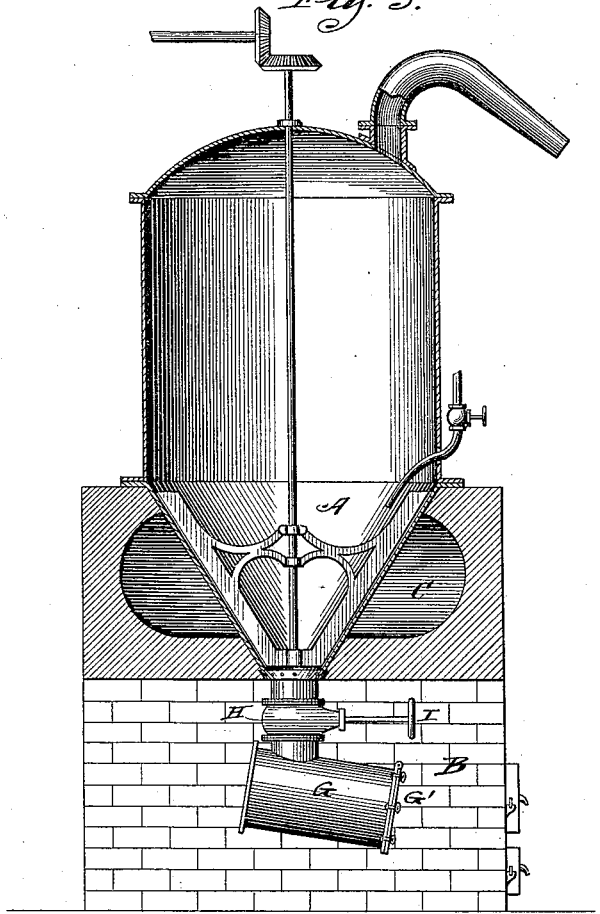
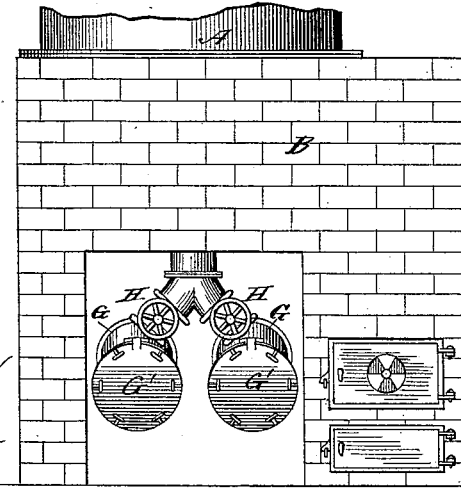

(No Model.) 4 Sheets—Sheet 3.

A. DOMEIER & O. C. HAGEMANN.
APPARATUS FOR CONCENTRATING SPENT SOAP LYE.

No. 428,469. Patented May 20, 1890.

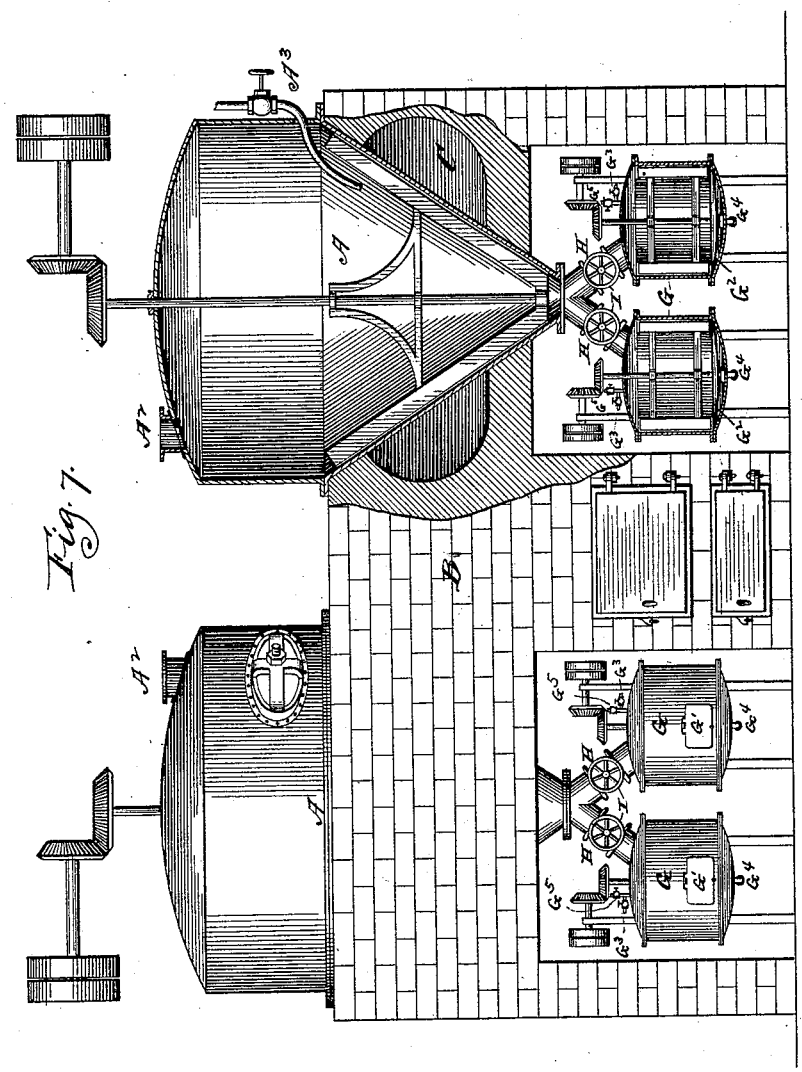

UNITED STATES PATENT OFFICE.

ALBERT DOMEIER AND OTTO CHRISTIAN HAGEMANN, OF LONDON, ENGLAND, ASSIGNORS TO JAMES S. KIRK & CO., OF CHICAGO, ILLINOIS, AND ALBERT DOMEIER, OF LONDON, ENGLAND.

APPARATUS FOR CONCENTRATING SPENT SOAP-LYE.

SPECIFICATION forming part of Letters Patent No. 428,469, dated May 20, 1890.

Application filed September 9, 1889. Serial No. 323,372. (No model.) Patented in France April 24, 1889, No. 197,713.

*To all whom it may concern:*

Be it known that we, ALBERT DOMEIER, merchant, and OTTO CHRISTIAN HAGEMANN, chemical engineer, both of London, England, have invented certain new and useful Improvements in Apparatus for Concentrating Spent Soap-Lye to Recover Salt and Glycerine Therefrom, (for which we have obtained French patent No. 197,713, dated April 24, 1889,) of which the following is a specification.

The object of this invention is to provide an improved apparatus for the concentration of spent soap-lye or the glycerine-liquor prepared from spent soap-lye to recover the salt and glycerine therefrom.

During the concentration of spent soap-lye or the glycerine-liquor prepared therefrom by chemical treatment a large amount of mineral matters or salts—*e. g.*, chloride of sodium or sulphate of sodium—separates out from the liquor, and such separation or precipitation of salts or mineral matters forms a serious obstacle to successful working. The salts being allowed to accumulate in the vessel wherein the boiling or concentration is carried on, they cake together, and the cakes or scales thus formed inclose much glycerine, which is thus lost, and if the accumulation takes place in close proximity of the heated surfaces of the apparatus the liquor or the glycerine therein is readily damaged by such portion of it as may be inclosed in the cakes or scales or in contact therewith getting too large a share of heat and thus becoming burned or decomposed, and the salts are also damaged by their intimate mixture with the overheated organic matters, and thus their purification for reuse becomes a matter of considerable difficulty. The apparatus is also liable to be burned or damaged whenever such accumulations of salts take place on such portions as are directly exposed to the influence of the heat necessary to carry on the operation. Even with the best attention given to the frequent removal of the deposit by taking it directly out of the boiling glycerine such objectionable accumulation cannot be entirely avoided, and in such case the removal of the deposit out of the boiling liquor necessarily entails the removal, also, of a considerable quantity of the concentrated liquor of glycerine, and by this loss of liquor various disadvantages are caused—such as irregular working, boiling over and loss of heat, and falling temperature through copious displacement of concentrated liquor or glycerine by liquor varying in temperature and density. Again, the concentrated liquor or glycerine once out of the apparatus must be recovered from the precipitated salts with which it is mixed, and as the liquors thus taken out in the course of the process vary in strength and quality it is disadvantageous to return them to the apparatus without being specially treated or kept separate. It is equally disadvantageous to merely pass a considerable quantity of liquor through the apparatus by such excessive takings-out and fillings-in, inasmuch as the progress of the concentration is thus delayed and the glycerine kept longer under the influence of the operation. In the feeding of the apparatus with fresh glycerine-liquor to take the place of the precipitates removed it is found that if such liquor is possessed of a less degree of concentration than the boiling liquor already in the apparatus a very objectionable boiling over is often caused through the less concentrated liquor giving off its excess of water suddenly upon mixing with the more highly concentrated boiling contents of the apparatus.

The object of this invention is to provide an apparatus to overcome these difficulties and to obtain the crude glycerine and salt from the soap-lye or glycerine-liquor in a more perfect manner than has hitherto been accomplished.

The essential feature of our invention is that it provides for the immediate removal as formed of the precipitated salts from the boiling portion of the liquor under operation to a quiescent portion, and consequently out of the way of heated surfaces and collects them in a convenient way for removal and in first-class condition for purification, overcoming all the difficulties before mentioned, and this without interrupting the progress of the boiling or concentration. We therefore provide an apparatus having two chambers both filled with the same liquor, the one adapted to be heated and the other located out of the influence of the heat, the mineral matters or salts forming in the heated chamber passing as formed into the one not heated, and both chambers being connected or separable at will by a convenient means—such as a valve—so that complete removal of the accumulated precipitates can be effected with thoroughness and at leisure without at the same time taking out of the apparatus a copious volume of concentrated glycerine-liquor, and by feeding fresh liquor into that part of the apparatus not heated we are enabled to cause a gradual mixing of such freshly-fed liquor with the boiling portion. We also provide in one form of the apparatus for the washing of the precipitated salts to free them from adhering glycerine-liquor before removal from the apparatus.

Figure 6:
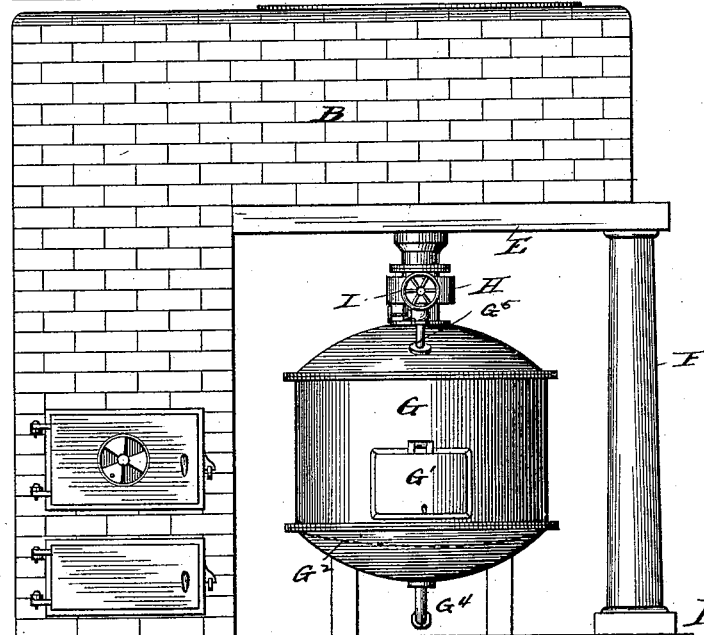

In the accompanying drawings, Figures 1 and 2 represent, respectively, a vertical section and plan of the simplest form of our apparatus, wherein the boiler or concentrating-vessel is open at the top, and fitted below with one chamber or vessel for holding the quiescent portion of the liquor and receiving the precipitated salts. Figs. 3 and 4 represent, respectively, a vertical section and front elevation of an apparatus wherein the boiler is closed and fitted with a mechanical agitator or scraper and with two lower chambers or vessels. Figs. 5 and 6 represent, respectively, a vertical section and front elevation of an open apparatus having one lower chamber or vessel which is fitted with a filter and induction and eduction pipes and valves for the purpose of washing the precipitated salts before removal. This form of apparatus is preferably provided with a "pocket" at the lower part of the upper or heated portion of the apparatus. Fig. 7 represents front elevation, partly in broken section, of a pair of apparatus set in brick-work, each being provided with two chambers or vessels to hold the quiescent portion of the liquor and receive the precipitated salts, said vessel being fitted with mechanical agitators to facilitate the mixing of the salts with the washing-liquors.

A is a boiler or vessel in which the concentration is effected; B, the surrounding brick-work, and C the flue or fire space.

E and F are respectively girders and columns to carry the apparatus when this form of construction is desirable.

$A'$ is an extension of A, forming a pocket. $A^2$ is an exit-pipe for the steam, and $A^3$ a pipe and valve for filling A and feeding in fresh liquor.

G is the cylinder or vessel which holds the quiescent portion of the liquor under operation, and into which the mineral matters or salts fall as they are formed in and precipitated from the liquor under operation in A. The connection between A and G can be closed at will by means of the valve H, operated by the hand-wheel L.

$G'$ is a door, through which the collected matters in G can be removed, and $G^2$ a strainer of filter.

$G^3$ is a pipe fitted with a valve, through which soap-lye or glycerine-liquor or brine containing less glycerine than the liquor adhering to the mineral matters or pure brine may be admitted for the purpose of washing the crystals of the mineral matters from the glycerine adhering to them, the deposits remaining on and above the strainer or filter $G^2$, and the liquor falling through the said filter and escaping by the pipe and valve $G^4$, from which it may be collected for reuse in any convenient manner, and $G^5$ is a valve to permit the ingress or egress of air to and from G.

At the commencement of the operation the vessel A is charged with the soap-lye or glycerine-liquor, which fills also the receptacle G, the communication between A and G being open and the valves $G^3$, $G^4$, and $G^5$ being closed. Heat is applied to A and the concentration begins, the water passing off as steam either into the atmosphere direct or through the exit-pipes $A^2$, from which it may be taken to a condenser, where its heat may be utilized or dealt with in any other convenient manner. As the concentration proceeds, the salt-crystals as formed, instead of accumulating in the boiling liquor, pass into the receptacle G, it being remembered that the liquor in G is quiescent, the crystals being thus removed immediately they are formed from contact with the heated surfaces of A and the boiling liquor therein. The level of the liquor in A may be maintained by feeding in fresh liquor continously through the pipe $A^3$ when the relative qualities of the fresh and boiling liquors permit, or by intermittent feeding in of such liquor through $A^3$, or, by preference, from below through $G^3$ or $G^4$, where most of it displaces the old liquor by pushing it into the boiling portion, and is itself only very gradually intermixed with the stronger liquor. As soon as the receptacle G is filled, or as far filled as may be desirable with the deposited salts, the valve H is closed and in the case of using the apparatus of Figs. 1, 2, 3, and 4 the door $G'$ is opened and the salts removed to a convenient apparatus for washing them.

In the case of using the apparatus of Figs. 5, 6, and 7 after the valve H is closed, the valves $G^4$ and $G^5$ are opened, and after the glycerine-liquor adhering to the salts is drawn off or allowed to run off through the pipe $G^4$ to a suitable receptacle $G^4$ is then closed and a suitable quantity of washing-liquor run in through the pipe $G^3$, which is then closed, and $G^4$ is again opened and the washing-liquor withdrawn for reuse or concentration. This operation is repeated as often as may be necessary, and finally the door $G'$ is opened and the washed salts removed. The collected matters in G having been removed with or without washing, the door $G'$ is closed and G is filled with fresh liquor through $G^3$ or $G^4$ or otherwise, and the valves $G^3$, $G^4$, and $G^5$ being closed the valve H is opened, and the concentration, which has not been interrupted by the removal or washing and removal of the mineral matters or salts, proceeds as usual.

The vessel or duplicate vessels G may be mounted with mechanical agitators, as shown at $G^6$, Fig. 7, for the more complete mixing of the washing-liquors with the salts, or such mixture may be very conveniently effected by blowing air through the mass—for instance, by way of the pipe $G^4$—and the removal of the washing-liquor may be effected by direct suction or by air or similar pressure from above, or, when time permits, by gravitation without pressure.

Instead of filling fresh liquor into G after each removal of collected matters therefrom, the valves $G^3$, $G^4$, and $G^5$ may be closed and the valve H opened, when the hot liquor from A will flow into G, the air in G escaping upward, or, by preference, $G^5$ may be kept opened for the escape of air until G is filled. The liquor thus transferred from A to G will in turn be displaced and forced up again into A by the salts as they are precipitated; but as there is an inevitable loss of heat in this method of working it is preferable to refill the vessels G with fresh liquor after each time of emptying.

The apparatus shown in Figs. 5 and 6 is a very convenient form for use in small soap-factories where there is no separate apparatus for washing the recovered salts, the pocket A' receiving and retaining the small amount of such salts as are precipitated, while the valve H is closed for the washing and removal of the salts previously precipitated from G. The shape of the said portions of the apparatus may vary, as also the materials of which they are constructed, and the mode of applying heat to the boiler or heated portion. For instance, where it is desirable not to employ fire in the same building where the apparatus is situated the part A may be jacketed and heated with ordinary or superheated steam, and as to materials of construction we have employed cast and wrought iron, steel, and copper with satisfactory results.

The apparatus may be fitted with thermometers or pyrometers to control the temperature, as is well understood, and Figs. 3, 4, and 7 may be operated at ordinary or diminished atmospheric pressure without interrupting or otherwise interfering with the continuity of the working.

We claim—

1. An apparatus for concentrating spent soap-lye or the glycerine-liquor prepared therefrom, having a chamber to contain a portion of the liquor to be concentrated, and means for heating the same, said chamber having walls converging toward its lower end, a discharge-opening in said end, and a closed chamber located below the first and communicating therewith by a valve-controlled passage, substantially as described.

2. An apparatus for concentrating spent soap-lye or the glycerine-liquor prepared therefrom, having a chamber to contain a portion of the liquor to be concentrated, and means for heating the same, and a closed chamber located below the first and communicating therewith by a valve-controlled passage located out of the direct influence of the heat, and a mechanical stirrer mounted within the said second chamber, substantially as described.

3. An apparatus for concentrating spent soap-lye or the glycerine-liquor prepared therefrom, having a chamber to contain a portion of the liquor to be concentrated, and means for heating the same, said chamber having walls converging toward its lower end and terminating in an extension forming a pocket, and a second vessel communicating therewith by a valve-controlled passage, substantially as described.

4. An apparatus for concentrating spent soap-lye or the glycerine-liquor prepared therefrom, having a chamber to contain a portion of the liquor to be concentrated, and means for heating the same, said chamber having a mechanical mixer mounted within and pipes for the removal of steam and introduction of fresh liquor, and a second chamber communicating therewith by a valve-controlled passage out of the direct influence of the heat, substantially as described.

5. An apparatus for concentrating spent soap-lye or the glycerine-liquor prepared therefrom, having a chamber to contain a portion of the liquor to be concentrated, and means for heating the same, and a second chamber communicating therewith by a valve-controlled passage located out of the direct influence of the heat and fitted with induction and eduction pipes for the purpose of washing the precipitated salts and introducing fresh liquor, substantially as described.

ALBERT DOMEIER.
OTTO CHRISTIAN HAGEMANN.

Witnesses:
OLIVER R. JOHNSON,
*Consulate-General U. S. A. at London, England.*
A. E. MOPOLD,
*U. S. Consulate-General, London.*